United States Patent [19]

Galasso et al.

[11] 4,225,355

[45] Sep. 30, 1980

[54] AMORPHOUS BORON-CARBON ALLOY IN BULK FORM AND METHODS OF MAKING THE SAME

[75] Inventors: Francis S. Galasso, Manchester, Conn.; Roy Fanti, Springfield, Mass.; Richard D. Veltri, East Hartford, Conn.

[73] Assignee: United Technologies Corporation, Hartford, Conn.

[21] Appl. No.: 12,929

[22] Filed: Feb. 16, 1979

[51] Int. Cl.² .............................................. C01B 31/36
[52] U.S. Cl. ...................................... 106/43; 423/291; 427/249; 428/389
[58] Field of Search ................. 423/291, 439; 106/43; 427/249; 428/389; 118/49

[56] References Cited

U.S. PATENT DOCUMENTS

| | | | |
|---|---|---|---|
| 3,367,826 | 2/1968 | Heestand et al. | 427/249 X |
| 3,537,877 | 11/1970 | Reeves et al. | 427/249 |
| 3,671,306 | 6/1972 | Allen | 423/291 X |
| 3,805,736 | 4/1974 | Foehring et al. | 118/49 |
| 3,867,191 | 2/1975 | Glasso et al. | 428/389 |
| 4,017,587 | 4/1977 | Ditter et al. | 423/291 |

FOREIGN PATENT DOCUMENTS 150703  3/1953  Australia ................................. 427/249

*Primary Examiner*—G. O. Peters
*Attorney, Agent, or Firm*—Harry J. Gwinnel

[57] ABSTRACT

Processes of forming amorphous boron-carbon alloy in bulk form without crystallization are disclosed. Such products can be produced in thicknesses well in excess of ten mils by employing Reynolds number gas reactant flow conditions of 40 to 120. The resultant products of such processes having grain sizes preferably less than 30 Å are also disclosed.

22 Claims, 1 Drawing Figure

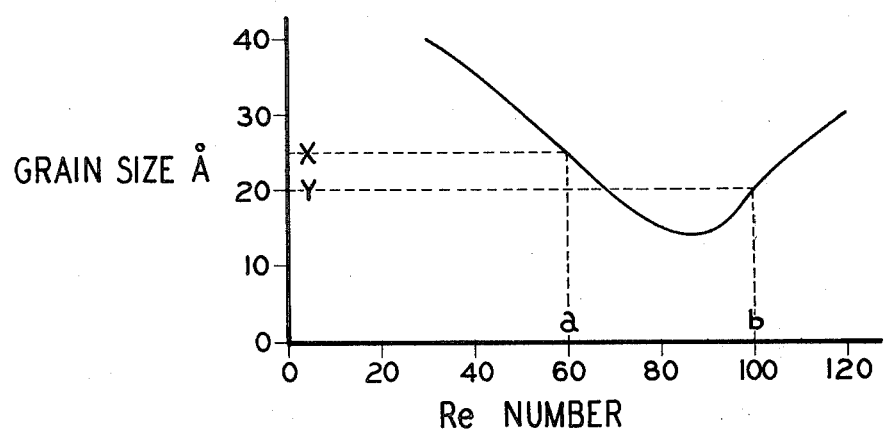

AMORPHOUS BORON-CARBON ALLOY IN BULK FORM AND METHODS OF MAKING THE SAME

CROSS REFERENCE TO RELATED APPLICATIONS

Application Ser. No. 12,930, assigned to the same assignee and of even filing date herewith, describes cutting tools made of amorphous boron-carbon alloys.

BACKGROUND OF THE INVENTION

1. Field of the Invention

The field of art to which this invention pertains is gas or vapor deposition of article-forming material onto a mold surface and articles so produced.

2. Description of the Prior Art

Attempts have been made in the past to produce hard, high modulus of elasticity, amorphous or extremely fine grained materials for such uses as reinforcements for composites, and other high strength applications. The problem in this area has been formation of such amorphous mateial in bulk form without crystallization. To insure the desired amorphous form of the boron-carbon alloy, the prior art has been limited to production of the alloy in relatively thin layes, e.g., less than 10 mils thick. Furthermore, permanently attached substrates have been used to provide the requisite strength for such thin samples. Note, e.g., U.S. Pat. No. 3,867,191. However, it would be much preferred to be able to produce boroncarbon alloys in bulk form without the resulting crystallization of such bulk production attempts in the past.

BRIEF SUMMARY OF THE INVENTION

According to the present invention, a method of producing amorphous boron-carbon alloy in bulk form without crystallization is described. The amorphous boron-carbon alloy is vapor deposited on a releasable mold or reaction surface from a mixture of carbon and boron containing gases. By utilizing a releasable mold or reaction surface and deposition according to the present invention, not only can a variety of sized and shaped articles be produced but such articles can be produced in bulk form without crystallization and with such properties as no discernible grain boundaries, no sharp X-ray diffraction pattern, smooth surface, high modulus of elasticity and hardness. Reactive gas flow conditions producing Reynolds numbers of 40 to 120 allow the formation of amorphous structures with thicknesses far in excess of the less than 10 mils of the prior art (note U.S. Pat. No. 3,867,191).

The foregoing and other objects, features and advantages of the present invention will become more apparent from the following description of preferred embodiments and accompanying drawing.

BRIEF DESCRIPTION OF THE DRAWING

The FIGURE demonstrates graphically the realtionship of Reynolds numbers of grain sizes produced in processes of the present invention.

DETAILED DESCRIPTION OF THE PREFERRED EMBODIMENT

According to the method of the present invention, a reaction surface of the desired shape is subjected to a mixture of a carbon containing gas, a boron containing gas, and a reducing gas, at elevated temperatures to produce amorphous boron-carbon alloy in bulk form without crystallization. By amorphous is meant an extremely fine grained material, i.e., the absence of detectable grain boundaries when viewed with an electron microscope and extremely broad peaks when viewed with X-ray diffraction apparatus.

The carbon containing gas can be a $C_1$ to $C_5$ containing hydrocarbon or halogenated derivative thereof, with $CH_aX_b$ wherein $a+b=4$ and X is Cl, Br, F, I, or combinations thereof, being preferred and $CH_4$ being most preferred. The boron source can be diborane of preferably $BX_3$ with X defined as above and $BCl_3$ being most preferred. And hydrogen is the preferred reducing gas used.

By controlling the Reynolds number flow condition of the deposition, which also depends to some degree on the temperature of deposition and ratios of reactants, the bulk samples (greater than 10 and preferably greater than 40 mils) are produced. Such deposition conditions are also evidenced by such things as the absence of grain boundaries in the boron-carbon alloy produced and the lack of sharp X-ray diffraction patterns in the boron-carbon samples produced by the present invention.

The Reynolds number is a ratio defined in terms of the velocity of reactive gas flow, the diameter of the reaction vessel, the viscosity of the gaseous reactants and their density. Numerically this ratio is defined by the following formula:

$$Re = Dv\rho/\mu$$

where
D = diameter of the reaction chamber,
v = velocity of flow of the gas mixture in the reaction chamber,
$\rho$ = density of the gas mixture, and
$\mu$ = viscosity of the gas mixture.

Reynolds numbers of 40 to 120 result in bulk deposition according to the present invention without crystallization, with Reynolds numbers of 60 to 100 giving the smallest detectable grain sizes, which would be the most preferred embodiment of this invention. The grain sizes can be calculated from X-ray diffraction data according to well-known and accepted procedures. Note *Elements of X-Ray Diffraction*, B. D. Cullity (Addison-Wesley Pub. Co., 1956).

The temperature of reaction of the gases is preferably 950° C. to 1300° C. At temperatures below 950° C., excess carbon is produced tending to result in a sooty reaction product. And above 1300° C., reaction takes place too rapidly tending to result in crystalline boron formation intertwined with the carbon. While temperature ranges between 950° C. and 1300° C. give useful products according to the present invention, optimum results are obtained between 1120° C. and 1170° C. Generally, useful articles above 40 mils in thickness can be obtained over these temperature ranges in one to two hours.

The ratio of reactants may vary somewhat. Note the Table. However, to obtain the preferred minimal grain size, the molar ratios of carbon containing gas to boron containing gas is 0.5/1.0 to 6.0/1.0, carbon containing gas to boron+carbon containing gases 0.3/1 to 0.9/1, and carbon containing gas to total gaseous reactants (C, B and reducing gases) 0.15/1 to 0.5/1.

EXAMPLE I

In an exemplary system, a mixture of methane, boron trichloride, and hydrogen gases having a density of $7.99 \times 10^{-4}$ cm/cc and a viscosity of $4 \times 10^{-4}$ poise were flowed through a cylindrical glass reaction chamber with a diameter of 1.22 cm at a rate of 26.67 cm/min. The system, with a Reynolds number of 64.99, produced bulk amorphous boron-carbon alloy with no crystallization.

EXAMPLE II

A flat glass plate and a glass rod were placed in a cylindrical glass reaction vessel 1.22 cm in diameter. A mixture of 650 cc of $CH_4$, 278 cc of $BCl_3$ and 780 cc of $H_2$ gases were flowed through the chamber contacting the plate and rod at an internal chamber temperature of 1182° C. The chamber was at atmospheric pressure and the flow rate was 850 cc per minute. A Reynolds number of 90 was calculated for the system. A 50 mil thickness of baron-carbon alloy was measured on the plate and rod after one and a half hours. The structures after being removed from the rod and plate by light tapping of the composites were found to have smooth surfaces, showed no discernible grain boundaries under electron microscope examination, or sharp X-ray diffraction pattern, and were found to contain 43% by weight carbon upon analysis. The grain size of the bulk amorphous boron-carbon alloy produced was calculated to be between 15 and 18 Å.

As demonstrated graphically by the FIGURE, the products with the optimum properties are obtained with Reynolds numbers between 60 and 100, designated as points a and b on the graph. Such values produce grain sizes less than 30 Å and optimally less than 15 Å. Products within this range have the optimum hardness, strength, modulus of elasticity and other properties associated with the highly amorphous, very fine grain size structures produced in these examples.

A series of four runs were also made varying reactant flow rates and reactant ratios to demonstrate the relationship of various Reynolds numbers to grain sizes and percent carbon in the final products. As can be seen from the Table, by varying the carbon containing gas flow rate from 300 to 800 cc/min., the boron containing gas flow rate from 150 to 500 cc/min., and the reducing gas flow rate from 780 to 800 cc/min., (and gaseous reactant ratios

TABLE

| | (cc per minute) | | | (molar ratios) | | | % C | | |
|---|---|---|---|---|---|---|---|---|---|
| Run # | $CH_4$ | $BCl_3$ | $H_2$ | $CH_4/BCl_3$ | $CH_4/CH_4 + BCl_3$ | $CH_4/CH_4 + BCl_3 + H_2$ | (by wt.) | A | Re# |
| 1 | 300 | 500 | 800 | .6/1.0 | .375/1.0 | .187/1.0 | 36.8 | <20 | 105.2 |
| 2 | 500 | 500 | 800 | 1.0/1.0 | .5/1.0 | .277/1.0 | 37.5 | <28 | 112.5 |
| 3 | 650 | 278 | 780 | 2.31/1.0 | .7/1.0 | .381/1.0 | 43.0 | <20 | 76.6 |
| 4 | 800 | 150 | 800 | 5.3/1.0 | .842/1.0 | .455/1.0 | 78.2 | <35 | 53.3 | accordingly) a difference of 53.3 to 105.2 was observed in the Reynolds numbers, 20 to 35 Å in the grain size, and 36.8 to 78.2% by weight carbon content in the final products. It should be noted that while a wide range of percent carbon is useful in the present invention, structures with percent carbon (by weight) between 30 and 70% are preferred.

Most common uses of the bulk boron-carbon of the present invention are as reinforcements for composites, such as in an epoxy or other polymer matrix, as a backing for mirrors, as amorphous semiconducting devices, as continuous filaments, and in cutting tools (note Ser. No. 12,930). For example, as a mirror backing, the amorphous material having no grain boundaries would have isotropic expansion. Also, in the bulk amorphous structure each grain would not polish differently, almost like a cubic material. This would be ideally suited for the subsequent deposition of a reflecting layer. Such material would also be useful in the whole area of electronics, such as thermistors and semiconductors where there is a change of properties with a change in temperature. The stability of a boron-carbon substrate in such utilities would be particularly advantageous.

Although this invention has been shown and described with respect to a preferred embodiment, it will be understood by those skilled in this art that various changes in form and detail thereof may be made without departing from the spirit and scope of the claimed invention.

Having thus described a typical embodiment of our invention, that which we claim as new and desire to secure by Letters Patent of the United States is:

1. A process of forming amorphous boron-carbon alloy in bulk form comprising:
   subjecting a releasable mold reaction surface to a gaseous mixture of at least one boron-containing gas, at least one carbon-containing gas, and a reducing gas, at temperatures of 950° C. to 1300° C., and Reynolds Number flow condition of 40–120, until an amorphous boron-carbon alloy structure at least 40 mils thick is deposited on the mold reaction surface, and removing the formed structure from the mold reaction surface.

2. A process of forming amorphous boron-carbon alloy in bulk form comprising:
   subjecting a releasable mold reaction surface to a gaseous mixture comprising $CH_aX_b$ wherein $a+b=4$ and X is selected from the group consisting of F, Cl, Br or I or combinations thereof, $BX_3$ where X is defined as above, and a reducing gas, at temperatures of 950° C. to 1300° C., and Reynolds number flow condition of 40 to 120, until a structure at least 40 mils thick is deposited on the mold reaction surface, and removing the formed structure from the mold reaction surface.

3. A process of forming amorphous boron-carbon alloy in bulk form comprising:
   subjecting a releasable glass mold reaction surface to a gaseous mixture of $CH_4$, $BCl_3$ and $H_2$ with a $CH_4/BCl_3$ ratio of 0.5/1 to 6.0/1, a $CH_4/(CH_4+BCl_3)$ ratio of 0.3/1 to 0.9/1, a $CH_4/(CH_4+BCl_3+H_2)$ ratio of 0.15/1 to 0.5/1, at temperatures of 1120°–1170° C. and a Reynolds number flow condition of 60 to 100, producing a structure at least 40 mils thick and having a grain size less than 3 Å, and removing the formed structure from the mold surface.

4. The process of claims 1 or 2 wherein the releasable surface is a glass molding surface.

5. The process of claims 1, 2 or 3 wherein the releasable surface is a flat plate or tube.

6. The process of claim 1 wherein the carbon containing gas is a $C_1$ to $C_5$ containing hydrocarbon or halogen containing derivative thereof.

7. The process of claim 1 wherein the boron containing gas is a halogenated boron compound or diborane.

8. The process of claim 7 wherein the halogenated boron compound is $BX_3$ where X=F, Cl, Br, I or a combination thereof.

9. The process of claim 1 wherein the reducing gas is hydrogen.

10. The process of claims 1 or 2 wherein the carbon source is $CH_4$ and the boron source is $BCl_3$.

11. The process of claims 1 or 2 wherein the Reynolds number is 60 to 100.

12. The process of claims 1 or 2 wherein the temperature is 1120° C. to 1170° C.

13. The process of claims 1 or 2 wherein the temperature is 1182° C.

14. The process of claims 1 or 2 wherein the process is carried out for 1 to 2 hours.

15. The process of claims 1 or 2 wherein the boron-carbon alloy has a grain size less than 30 Å.

16. The process of claim 15 wherein the grain size is less than 15 Å.

17. The process of claims 1 or 2 wherein the ratio of carbon to boron containing gas is 0.5/1 to 6.0/1, the ratio of carbon containing gas to carbon and boron containing gas is 0.3/1 to 0.9/1, and the ratio of carbon containing gas to carbon, boron and reducing gases is 0.15/1 to 0.5/1.

18. An amorphous, free-standing, hard, thick boron-carbon alloy structure at least 40 mils thick having a high modulus of elasticity, a grain size less than 30 Å, no sharp discernible X-ray diffraction pattern, a smooth surface, isotropic expansion and no grain boundaries.

19. The article of claim 18 in the shape of a flat plate or tube.

20. The article of claim 18 having a grain size less than 15 Å.

21. The article of claim 18 having from 30 to 70% by weight carbon.

22. The process of claims 1, 2 or 3 wherein the structure contains 30 to 70% by weight carbon.

* * * * *